J. Thompson,
Mower.
No. 13508. Patented Aug. 28, 1855.
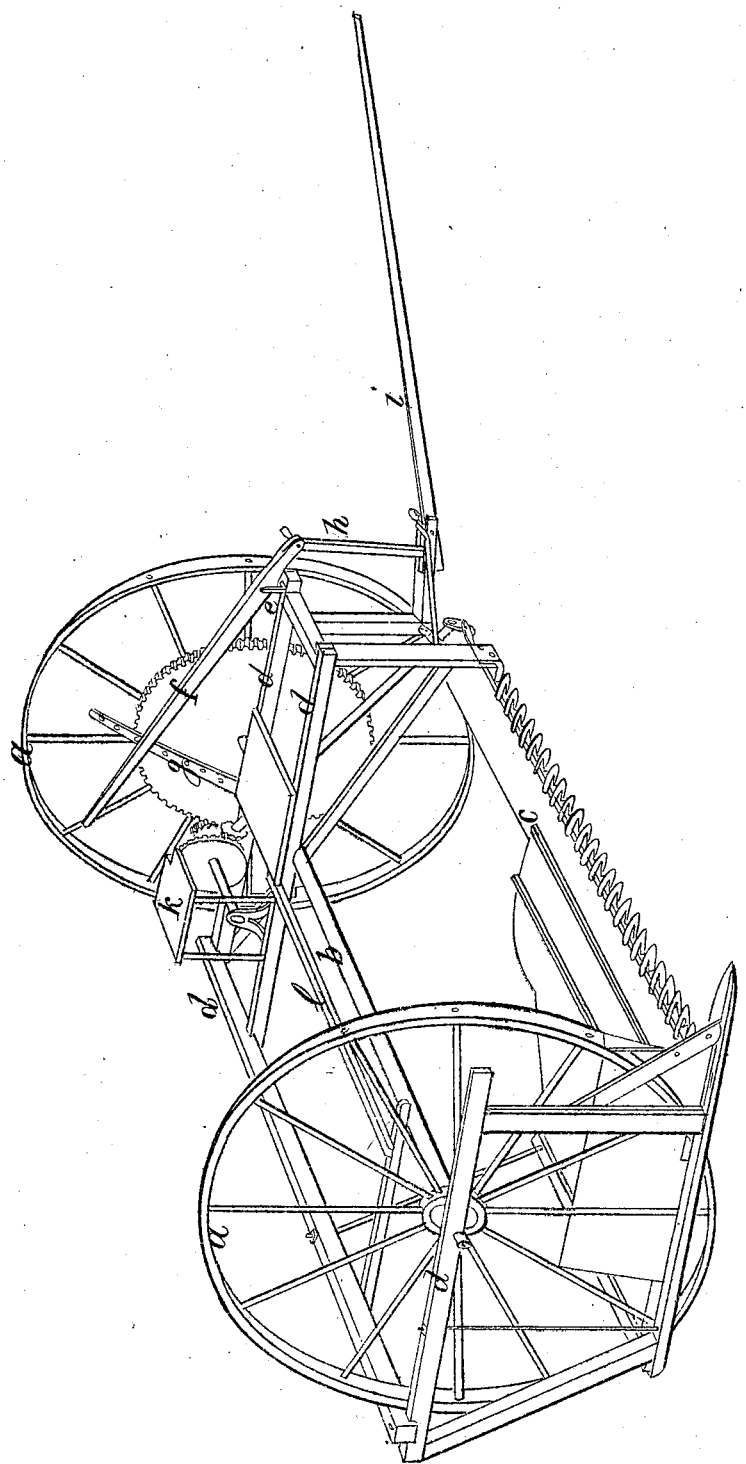

UNITED STATES PATENT OFFICE.

JOHN THOMPSON, OF CLIFTON, NEW YORK.

IMPROVEMENT IN GRAIN AND GRASS HARVESTERS.

Specification forming part of Letters Patent No. 13,508, dated August 28, 1855.

*To all whom it may concern:*

Be it known that I, JOHN THOMPSON, of Clifton, in the county of Monroe and State of New York, have invented Improvements in Machines for Cutting Grain and Grass; and I do hereby declare that the following is a full, clear, and exact description of the principle or character which distinguishes them from all other things before known, and of the usual manner of making, modifying, and using the same, reference being had to the accompanying drawings, of which the figure represents a perspective.

My invention consists in the extension of the axle in reaping-machines across the machine at such height that the grain or grass may be gathered and discharged under the axle, as hereinafter described.

The two wheels $a$ $a'$ are of such a diameter that their axle $b$ is at a sufficient height above the cutting apparatus $c$ not to interfere with the discharge of the cut grass or grain under said axle, it being understood that the grain or grass from the heaviest mowing may be passed or raked freely under the axle by the attendant who leans over and against the cross-bar $l$. I usually make my wheels six feet in height. They may be more or less, but must be high enough to admit of the discharge of the grain or grass in the manner stated. In harvesters heretofore used the axles of the wheels form a very serious impediment to the proper and expeditious discharge of the cut grass or grain—an inconvenience which will be entirely overcome by the above arrangement. The frame $d$, which carries the cutting apparatus $c$, is suspended from the axle $b$, so as to be free to swing on said axle. A support, $e$, is attached to the frame $d$ in front of the driver's seat $k$, and serves as a fulcrum to a lever, $f$, the longer arm of which extends back to the side of the driver's seat. Near this end of the lever it contains a slot, which allows it to be moved freely up and down an upright arm, $g$, which is also firmly attached to the frame $d$. Holes in this arm $g$ and a pin serve to fix the lever $f$ at any desired height above the frame. A vertical rod, $h$, connects the short arm of the lever $f$ in front of the frame $d$ with the rear end of the tongue $i$, which is hinged to the lower part of the frame $d$ a little in front of said connecting-rod $h$. The front end of the tongue, to which the horse is attached, always remaining at the same height above the ground, it is evident that a depression or elevation of the handle of lever $f$ will elevate or depress the rear end of the tongue, and with it the cutting apparatus. By these means the grass or grain can be cut at any desired height above the ground.

By the use of the large wheels the draft is rendered easy, and especially so in rough land and in sections of country where the land is drained by what are called "dead-furrows," which very often "swamp" machines with low wheels if the wheel should get into them lengthwise the furrow, and which are difficult to be crossed by low wheels. By my arrangement of the large wheels and axle, and mode of discharging the grain, I have attained a light machine of easy draft.

What I claim is—

Discharging the grain from the platform between the platform and the driving-wheel and under its axle, when the same is done in connection with a pair of wheels whose axle extends across the machine, substantially as hereinabove described.

JOHN THOMPSON.

Witnesses:
T. CAMPBELL,
R. I. FALCONER.